United States Patent
Hausbichler et al.

(10) Patent No.: US 6,592,249 B1
(45) Date of Patent: Jul. 15, 2003

(54) DEVICE FOR PRODUCING AND/OR PROCESSING MIXTURES CONSISTING OF MULTIPLE CONSTITUENTS

(75) Inventors: Hannes Hausbichler, Bregenz (AT); Günter Baldauf, Hohenweiler (AT)

(73) Assignee: EDF Polymer-Applikation Maschinenfabrik GmbH, Horbranz (AT)

( * ) Notice: Subject to any disclaimer, the term of this patent is extended or adjusted under 35 U.S.C. 154(b) by 0 days.

(21) Appl. No.: 09/806,114

(22) PCT Filed: Oct. 19, 1999

(86) PCT No.: PCT/EP99/07937

§ 371 (c)(1), (2), (4) Date: Mar. 28, 2001

(87) PCT Pub. No.: WO00/23235

PCT Pub. Date: Apr. 27, 2000

(30) Foreign Application Priority Data

Oct. 21, 1998 (DE) .......................... 198 48 357

(51) Int. Cl.$^7$ .................. B01F 15/02; B01F 7/16
(52) U.S. Cl. .................. 366/184; 366/192; 366/195; 366/289; 366/286
(58) Field of Search .................. 366/289, 286, 366/332, 194, 195, 184, 192, 193

(56) References Cited

U.S. PATENT DOCUMENTS 3,164,375 A * 1/1965 Frenkel .................. 366/286
3,752,449 A    8/1973 Schwab, et al.

(List continued on next page.)

FOREIGN PATENT DOCUMENTS

DE    24 19 961    11/1975
DE    42 35 850     4/1994

(List continued on next page.)

OTHER PUBLICATIONS

International Search Report, dated Jan. 18, 2000.
International Preliminary Examination Report dated Nov. 2, 2000.
English translation of DE 4235850, Schreiber Translations, Dec. 2002, 17 pages.*

*Primary Examiner*—Tony G. Soohoo
(74) *Attorney, Agent, or Firm*—Fay, Sharpe, Fagan, Minnich & McKee (57) ABSTRACT

The invention relates to a device (10) for producing and/or processing plastic material mixtures comprising a mixing head (11) which has one or several inlets (15) for the mixture constituents and in which a mixer (17) provided for mixing the constituents is rotationally driven. An outlet (22) is provided in the mixing head for ejecting the finished mixture. Said outlet can be closed or opened by the head of the mixer in the manner of a nozzle needle. To this end, the mixer is arranged in the housing (12) of the device such that it can be axially displaced. In order to prevent an abrupt opening or closing of the outlet, which can thus lead to losses in quality when using sensitive plastic materials, the invention provides that the raising and lowering of the mixer in the mixing head is effected via a mechanical cam drive (40) comprising at least one actuating cam (42) which interacts with a lifting element (60) that acts upon the mixer (17) or the shaft thereof (24). Since the actuating cams can be fabricated and used in any desired contour, the invention makes it possible, when opening the outlet (22), to firstly lift the mixer slowly from the opening and then to continuously increase the opening speed, whereby the plastic material mixture in the mixing chamber can immediately fill, the mixing chamber volume which increases during opening. In addition, reductions in pressure are prevented thus avoiding consequential losses in the quality of the mixture.

63 Claims, 3 Drawing Sheets

U.S. PATENT DOCUMENTS

| | | | |
|---|---|---|---|
| 3,921,963 A | | 11/1975 | Neff, et al. |
| 4,824,255 A | * | 4/1989 | Wohlrab ..................... 366/289 |
| 4,833,645 A | | 5/1989 | Matsuda et al. |
| 4,955,544 A | | 9/1990 | Kopp |
| 5,123,833 A | * | 6/1992 | Parker ........................ 366/289 |
| 5,902,042 A | * | 5/1999 | Imaizumi et al. ........... 366/286 |

FOREIGN PATENT DOCUMENTS

| | | | |
|---|---|---|---|
| JP | 04122618 | * | 4/1991 |
| JP | 4122618 | | 4/1992 |
| JP | 05124071 | * | 5/1993 |
| JP | 5124071 | | 5/1993 |

\* cited by examiner

DEVICE FOR PRODUCING AND/OR PROCESSING MIXTURES CONSISTING OF MULTIPLE CONSTITUENTS

BACKGROUND OF THE INVENTION

The invention relates to a device for producing and/or for processing mixtures having several components, in particular plastic mixtures, the device comprising a mixing head with at least one inlet for the mixture or its components, with a rotatably driven mixer in the mixing head for mixing the mixture or its components and with an outlet for the mixture, whereas the mixer is arranged axially displaceable in the mixing head by means of a drive unit and releases or closes the outlet according to its axial position.

When processing plastic mixtures, for example for producing a seal moulded directly onto a valve lid, the individual components of the plastic mixture are to be mixed with one another, if possible, only immediately before the processing of the plastic material consisting of the several components. For the production and the processing of mixtures with several components, a typical device is known from DE-OS 42 35 850, in which the individual components of the plastic mixture to be processed are fed to a mixing head and are mixed therein by means of a rotating mixer. The final mixed mixture can leave the mixing head by means of an outflow and can be injected directly into a die or moulded onto a part, for example as a seal. With the known mixing device, the mixer serves also as a closing means for the outflow and can be axially displaced in the mixing head by means of a pneumatic cylinder which engages the mixer shaft, whereby the mixer closes the outflow in a valve needle-like manner in a first, lower position with an approximately conical point, and opens the outflow in a second, raised position so that the mixed plastics can be ejected.

This known device has proved to be very successful in practice, as the mixer does justice to its dual function on one hand as a mixing element, and on the other hand as a closing means, so that operation disturbances occur only rarely, and high qualities are achieved with the injected parts, in particular also with moulded-on seals. But it has been found that the sudden opening or closing movement of the mixer in the axial direction, when using the pneumatic cylinder acting immediately on the mixer shaft, results in a quality loss of the tools, seals or the like, which are produced from the mixture, when sensitive materials are processed. In consequence of the sudden starting and the very fast lifting of the mixer for opening the outlet, the volume in the mixing region of the mixing head is increased in a very short time to such an extent that, depending on the rheology of the produced mixture, or its components, these cannot flow fast enough from their inlet along the mixer side walls through the mixing region in the direction of the outlet, so as to fill the suddenly enlarged volume in this region. A low pressure can result from the sudden lifting of the mixer in the mixing head, in particular when the outlet is still filled with remainders of the mixture ejected from the previous processing. The low pressure in the mixing head can result, even though only for a short time, in an exhaling of the produced and processed plastic mixture in the mixing head, which results in a quality loss of the material to be processed or it does not have even processing qualities during the processing procedure. It can result that a part of a seal which is moulded onto a part by means of the device is foamed in a different way than the rest of the seal so that the complete seal does not obtain an even thickness and a reliable closure cannot be guaranteed with the seal which is being produced.

SUMMARY OF THE INVENTION

It is an object of the invention to improve a device of the above-mentioned type in such a way that a sudden opening or closing of the outlet opening by means of the mixer is avoided, and to thereby prevent the disadvantageous influences on sensitive materials which are to be processed. This object is achieved by means of the invention, in that the drive unit comprises a mechanical cam drive having at least one actuating cam which cooperates with a lifting element engaging the mixer or its shaft.

By the use of the cam gear, in which the actuating cam(s) lifts or lift the lifting element and therewith the mixer for opening the outlet, it is possible to increase the speed of the mixer during the opening from a very small value at the beginning of the lifting movement during the further course of the axial movement of the mixer. The cam drive permits the use of actuating cams with different cam areas, which can be adapted to the material and the flow behaviour of the material which is being processed in an optimal manner. As the opening speed of the mixer which closes the outlet in the manner of a needle valve is only small at the beginning of the opening movement, the mixture in the mixing head can readily fill the increasing volume in the mixing head during the critical opening movement, so that the mixer does not produce any low pressure by means of its displacement in the mixing chamber of the mixing head and the mixed mixture of several components which is to be processed cannot exhale and experience a quality loss. During the further course of the opening movement, in which the influence of the opening speed of the material which flows in the mixing head to the outlet is reduced noticeably and the danger of quality loss due to fast opening is not present, the opening speed will be increased considerably by correspondingly the formed actuating cam(s), so that the total time in which the outlet for the mixture with several components is released completely does not have to be larger than with the known devices, and a processing of the mixture can occur after the start of the opening movement of the mixer within the shortest time.

The cam drive has preferably at least one camshaft comprising an actuating cam, which shaft is mounted rotatably in a bearing housing at the side next to the mixer shaft. It is particularly suitable to provide a cam drive with two parallel camshafts each having an actuating cam, which camshafts are mounted rotatably in a common bearing housing on both sides of the mixer shaft. With this embodiment, the lifting element preferably engages the mixer shaft, so that the entire drive unit for the displacement of the mixture in its axial direction can be arranged away from the actual mixing head. Therefore, there is no danger that the drive unit contacts the mixture of the several components which is to be processed with its partially very precisely manufactured parts, which could lead to faults or inaccuracies when opening and closing the outlet. By the use of two parallel camshafts, which are preferably driven in a counter-rotating manner in the housing, it is ensured that the axial movement, which is produced when the cams during their rotation are hobbing at the lifting element, is introduced exactly axially into the mixer shaft so that this will not be cocked when the mixer is displaced. The camshafts suitably have a common drive element which ensures that the cams of both camshafts are always rotated by exactly the same amount and act evenly on the lifting element so as to lift the mixer in the mixing head or lower it when closing.

A particularly advantageous type of drive for the camshafts results when these are provided with a drive gear which can be rotated by a gear rack drive element which is driven in the axially displaceable direction. The gear rack drive element can be provided with a dual or peripheral gearing for both drive gears at the two camshafts which are preferably arranged in parallel. By the displacement of the gear rack drive element in its axial direction, the two drive gears of the camshafts and the actuating cams which are arranged thereon are preferably rotated in a counter-rotating manner, whereby the cams hob along the lifting element with their cam areas, and lift this or draw it back or lower it or move it forward, depending on the direction of the displacement of the gear rack drive element. A most advantageous design is that, in which the drive element consists essentially of the piston of a hydraulic or pneumatic piston-cylinder unit or is coupled thereto. The pressure which is exerted from the compressed air or the hydraulic fluid to the piston of the piston cylinder unit is transferred to the cam drive by the gear or by another suitable transfer element, and is converted into the uneven opening movement which lifts the mixer with an increasing speed from the outlet.

When using a piston-cylinder unit for the drive of the cam gear, a dual-acting cylinder can be used, to the cylinder chamber and to the annular chamber of which can be fed compressed air or hydraulic fluid so as to ensure the turning back of the cams for closing the outlet securely. A simpler but still very reliable design of the invention results when the drive element has a reset spring which is compressed during the opening movement of the mixer, and which returns into its original position for closing the drive element which it takes up when the outlet is closed. When the piston rod of the piston of a hydraulic or of a pneumatic cylinder is used as the drive element, the reset spring moves the drive element back automatically when the pressure in the cylinder of the piston-cylinder unit is reduced or cancelled.

So as to prevent that the reset spring, which is formed as a compression spring, bends to the side when compressed, the drive element preferably comprises an axial guide bore which receives the compression spring at least partially. The reset spring, which is formed as a compression spring, can, additionally to the guide bore or alternatively thereto, be wound around a guide mandrel which also ensures that the spring is only compressed or extended in its axial direction and that a lateral movement of the spring does not take place.

The actuating cam(s) preferably has/have a cam design with a steady or smooth course. Actuating cams designed in this way facilitate the lifting or withdrawing of the mixer in the mixing head with an evenly increasing speed without acceleration jumps, that is, without sudden movements of the mixer during the entire opening procedure, so that the volume in the mixing chamber increases continually and can be filled by the material to be processed without time delay. The actuating cams preferably have a cam radius which increases from the closed position to the position of the mixer which releases the outlet of the mixing head, whereby it is possible, with an even drive speed of the drive element, to increase the opening speed of the mixer continually when the outlet is opened or to decrease it from a high speed to a very low speed just before reaching the closed position when it is closed.

The actuating cams of the two camshafts arranged in parallel to one another are, as already mentioned, preferably arranged in a mirror-like image, and the corresponding camshafts are driven in a counter-rotating manner. The actuating cams can be arranged exchangeably at the corresponding camshafts, whereby it is facilitated that a simple exchange of only the actuating cams optimises the opening movement and the speed of the mixer for different mixtures to be processed. It is also possible to mount the complete camshafts exchangeably in the housing and to exchange them together with the actuating cams arranged thereon and possibly the drive gears with other camshafts, which offer advantages when a different material is processed.

The lifting element is preferably connected in the axial direction of the mixer shaft in an adjustable manner. The adjustable connection makes it possible to adjust the device in such a way that the actuating cam(s) in the closing position of the mixer do not have an immediate contact with the lifting element, so that it is ensured that the mixer closes the outlet completely with its tip. The lifting element can essentially consist of an actuating sleeve which surrounds the mixer shaft in a coaxial manner and a bearing reception for an axial bearing of the mixer shaft which is adjustably threaded thereto. The adjustability of the lifting element at the mixer shaft is facilitated by threading the bearing reception into or out of the actuating sleeve. The axial bearing, which transfers the axial movement which is exerted on the lifting element by means of the cams, and moves this thereby in the housing, consists preferably of a radial grooved ball bearing, which forms therewith at the same time the radial shaft bearing which is arranged at one end of the mixer shaft. The radial grooved ball bearing facilitates not only the rotation of the shaft around its own axis, but also allows the transfer of axial forces when the shaft is rotated for its displacement in the housing.

The lifting element can suitably be displaced axially in the housing by the actuating cam(s) against the force of a closing spring. The closing spring ensures a resetting of the lifting element and at the same time of the mixer for closing the outlet, when the actuating cams are turned back into their original position, which they inhabited before the opening of the outlet at the mixing head. The closing spring presses the mixer shaft and the mixer with its tip rigidly against the outlet and closes this reliably against the undesired exit of material which is still present in the mixing chamber.

A particularly simple and elegant design of the lifting element results when the bearing reception surrounds the mixer shaft in a sleeve-like manner and is provided with an outer thread, with which it is threaded into an inner thread which is provided at the actuating sleeve. The bearing reception can preferably be adjusted with regard to the actuating sleeve from the outside of the housing, for which it can be received in a guide sleeve in an axially displaceable manner, which is arranged rotatably in the housing, while the bearing reception is arrested in the peripheral direction with regard to the guide sleeve. When the guide sleeve is rotated in the housing, the bearing reception is also rotated with this design and can be threaded into the desired position into or out of the actuating sleeve. For arresting the bearing reception with regard to the guide sleeve, it is is preferably provided with at least one stopper pin which projects radially inwardly, which engages a groove which runs along the bearing reception in the radial direction. The bearing reception can move freely in the axial direction with regard to the guide sleeve, but it cannot rotate in the peripheral direction with regard to the guide sleeve. So as to easily facilitate a rotation of the guide sleeve from the outside of the housing, it is suitably provided with a tool connector which can be accessed from the outside of the housing.

A preferred design of the device according to the invention comprises at least one stopper element for the mixer or the mixer shaft. The stopper element limits the opening path which the shaft or the mixer has to cover for completely opening the outlet. The stopper element can be arranged in the head of a housing, with which the housing is closed at its end. The arrangement is preferably in such a way that the head of the housing forms a cylindrical reception for the upper or the rear end of the mixer shaft, whereby the reception has an inner thread, into which the stopper element is adjustably threaded. The adjustable arrangement of the stopper element in the head of the housing permits a change and an adaptation of the lifting path of the mixer, so that the size of the annular gap which is defined by the mixer tip and the outlet can be changed and adapted to materials having different properties. The mixer shaft preferably does not abut the stopper element, but the abutment takes place indirectly by means of the bearing reception. The closing spring can also be arranged in the head of the housing, whereby it acts on the mixer shaft or its bearing reception with its first end in the axial direction, and is supported on a spring stopper which is arranged in the head of the housing with its second end. It is particularly advantageous if the spring stopper is arranged adjustably in the head of the housing, for example like the stopper element which is threaded into the inner thread provided in the head of the housing. The first end of the closing spring can act on the mixer shaft by means of a spring plate which is supported on the bearing reception, which distributes the spring force evenly across the entire periphery of the bearing reception, and introduces it into the mixer as a purely centrally acting force.

The invention suggests a method for opening and closing a closing element in a device for producing and/or processing mixtures with several components, in particular for operating a device according to the preamble of claim 1, in which the closing element or the mixer forming it is first lifted slowly from the outlet opening during the opening for releasing an outlet, and is, with an increasing distance from the outlet opening, moved away therefrom increasingly faster, and in which, during the closing for shutting off the outlet, the closing element, which has a distance from the outlet opening, will initially be moved with a higher speed towards the opening, and with decreasing distance from the opening, when it is getting nearer thereto, the closing speed will be reduced. Such a method, which can be carried out in a particularly advantageous manner by means of the cam drive of the device according to the invention, but which can also be realised by means of another suitable drive means at the device, such for example a controlled hydraulic drive, facilitates a very gentle treatment of sensitive materials when they are processed in the mixing head, so that parts having a high quality can be produced by means of the method.

BRIEF DESCRIPTION OF THE DRAWINGS

The foregoing objects, and others, will in part by obvious and in part pointed out more fully hereinafter in conjunction with the written description of preferred embodiments of the invention illustrated in the accompanying drawings in which.

DESCRIPTION OF THE PREFERRED EMBODIMENTS

Referring now in greater detail to the drawings wherein the showings are for the purpose of illustrating preferred embodiments of the invention only, and not for the purpose of limiting the invention, in the drawing, 10 designates a device according to the invention for mixing and processing the components of a plastic mixture, for example of a sealing foam, which is molded onto a part for forming a seal.

Figure 1:
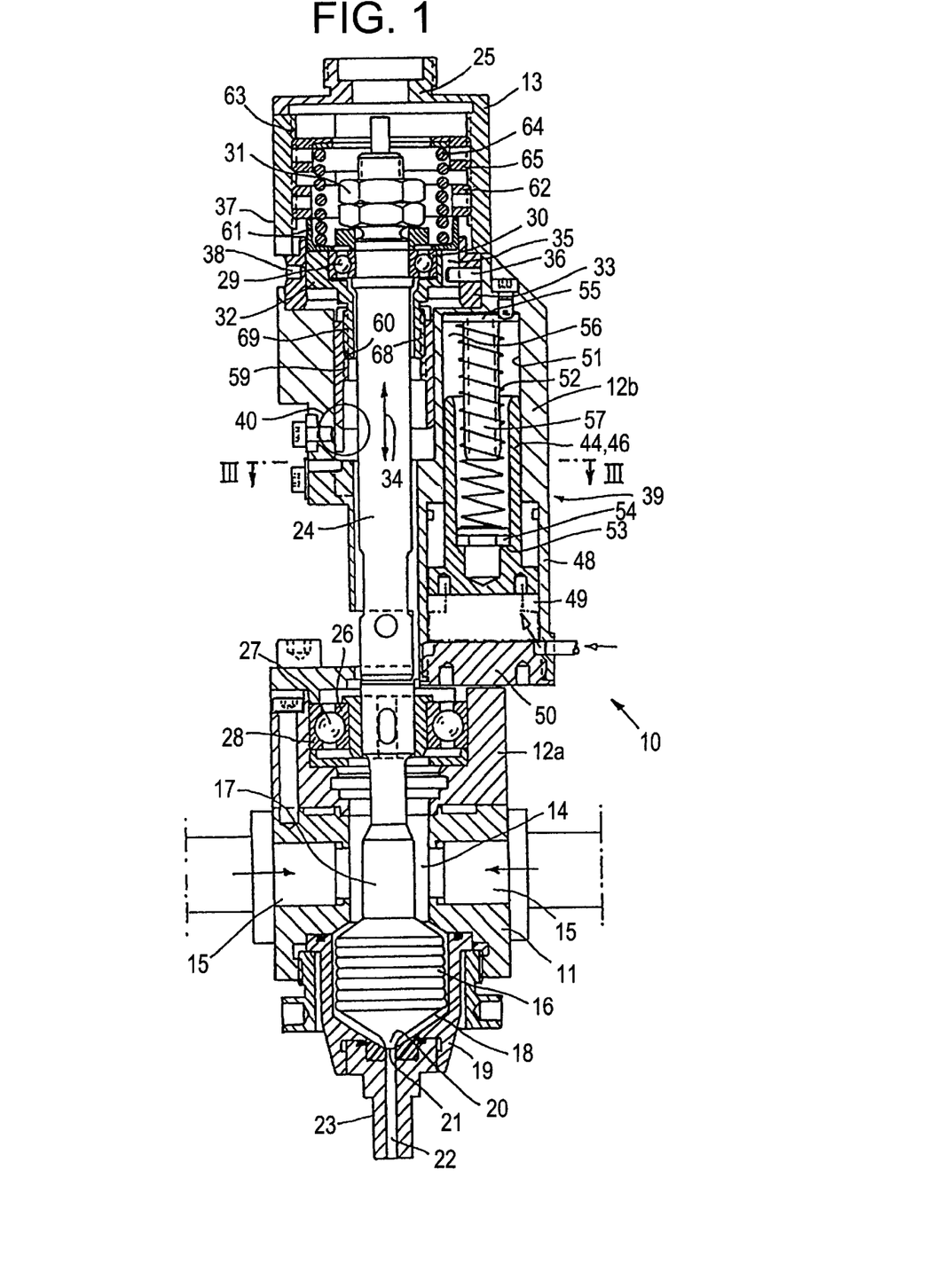
FIG. 1 is a sectional elevation view of a device for processing plastic mixtures according to the invention.
Figure 2:
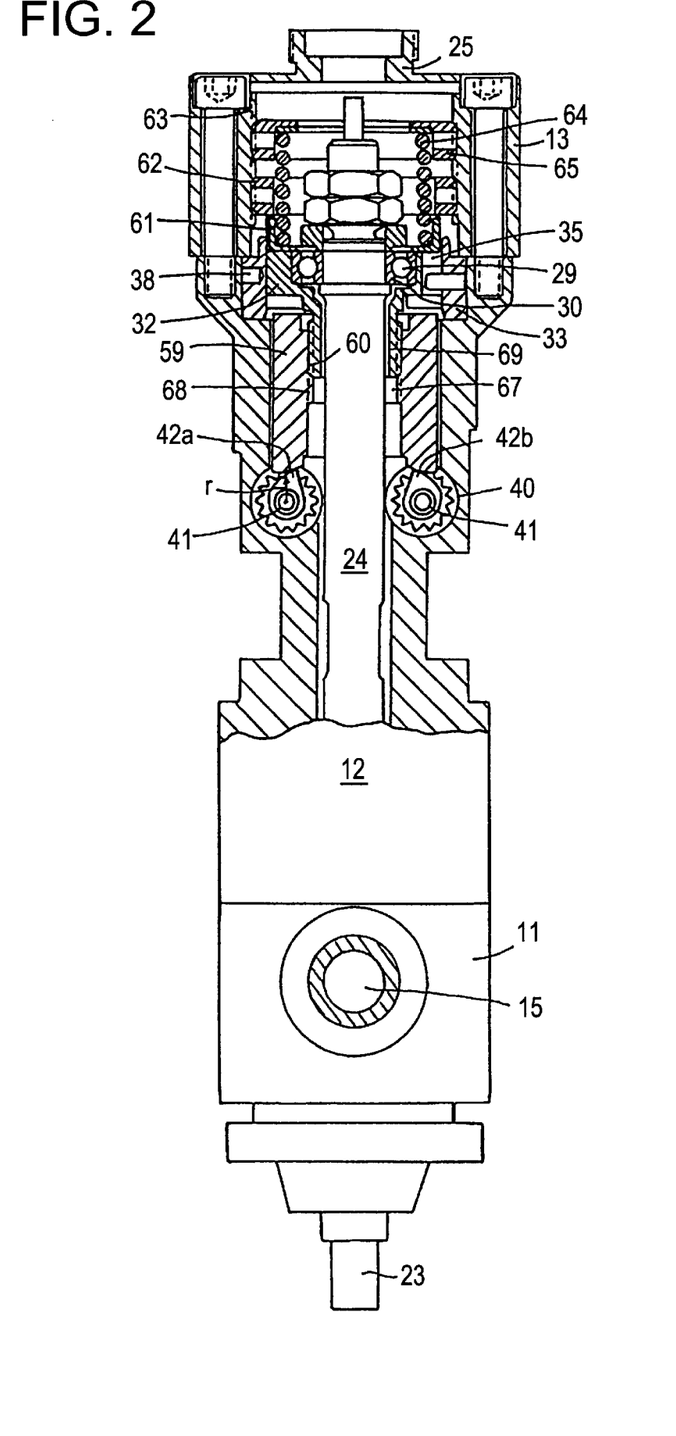
FIG. 2 is a partial sectional elevational view of the device illustrated in FIG. 1.

The device 10 consists essentially of a mixing head 11 depicted at the bottom of FIGS. 1 and 2 having a bearing housing 12 flanged thereto, which is again closed at its upper end with a head 13 of a housing. A mixing chamber 14 is formed in the mixing head 11 in a known manner, into which several inlets 15 flow radially, through which the components of the plastic mixture to be mixed are introduced, and which have to be moulded onto the part, not shown.

The lower part of the mixing chamber 14 is filled by the mixing head 16 of a mixer 17 while forming a gap 18 with the wall 19 of the mixing chamber, with the aid of which the supplied plastic components can be mixed with one another. The mixer is formed in the shape of a cone at its front end, in the drawing the lower end, the tip 20 of which is immediately in front of the opening 21 of a mixture outlet, which is arranged in the manner of a cannula similar to a syringe in the lower or front tip 23 of the mixing head 11.

The mixer 17 is connected to a mixer shaft 24 for rotational operation, which is rotatably mounted in the bearing housing 12. A drive motor, not shown, effects the drive, it is flanged to the head 13 of the housing and its drive shaft projects into the head of the housing through an opening which is arranged in the lid 25 of the head of the housing and is connected to the upper end of the mixer shaft 24 by means of a suitable coupling.

The mixer with its mixing head 16 does not only serve to mix the individual components of the plastic mixture to be processed, but it has also the object to close or to release the opening 21 of the outlet 22 for ejecting the mixture with its front tip 20 in the manner of a nozzle needle. To this end, the mixer 17 is mounted with its mixer shaft 24 in an axially displaceable manner in the mixing chamber 14 or in the bearing housing 12. The arrangement is set out in such a way that the mixer shaft 24 can move with regard to the inner ring 26 of the lower main roller bearing 27 of the shaft, which is mounted with its outer ring 28 rigidly between two housing parts 12a, 12b of the bearing housing 12. The mixer shaft 24 at its upper end in the drawing is mounted with a second bearing 29, the inner ring 30 of which is set on a shaft shoulder by means of a counter-rotating shaft nut 31, whereas the outer ring of the roller bearing 29, which is arranged as a, grooved ball bearing is arranged in a bearing reception 32. The bearing reception is again mounted in an axially displaceable manner in a guide sleeve 33, whereby it comprises a groove 35 in the axial direction 34 for ensuring it against rotation with regard to the guide sleeve, into which groove engages a stopper pin 36, which is arranged at the guide sleeve and projects radially inwardly.

The guide sleeve 33 is provided with a tool connection 38 at its outer periphery, which can be accessed from the outside 37 of the housing, so that it can be rotated in the housing with a suitable tool from the outside.

Figure 3:
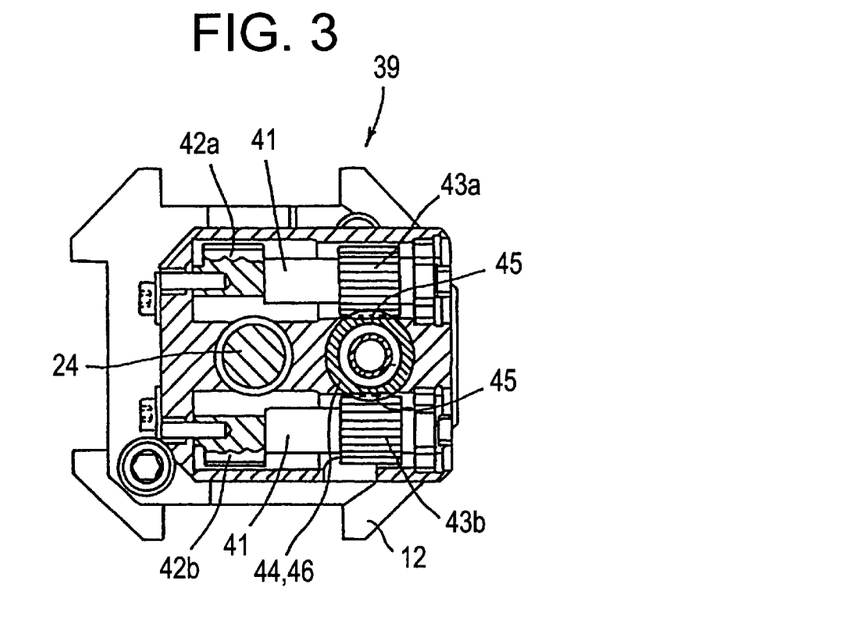
FIG. 3 is a cross sectional view taken along line III—III in FIG. 1.
Figure 4:
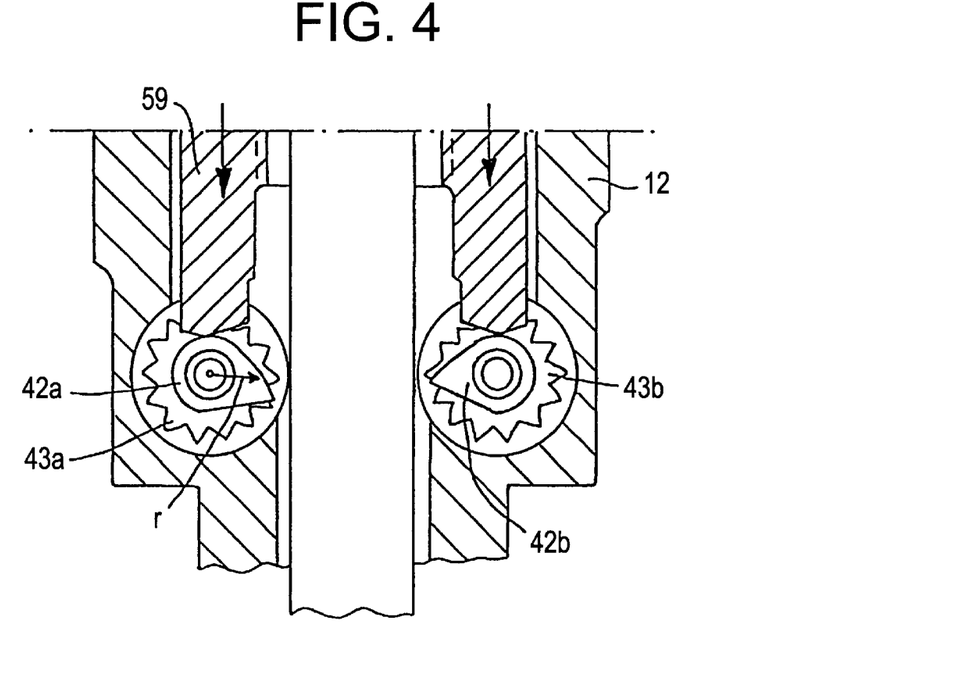
FIG. 4 is an enlarged partial sectional view of a part of the drive unit of the device according to the invention in its closed position.

The device is provided with a drive unit 39 for moving the mixer shaft 24 in the housing 12 and thereby for lifting the mixer 17 from the opening 21 of the outlet 22, which unit consists essentially of a mechanical cam drive which can best be seen in FIGS. 2 to 4. The cam drive 40 comprises two parallel camshafts 41 having an actuating cam 42a,b each, formed at one end of the camshafts, which are rotatably mounted in the bearing housing 12 on both sides of the mixer shaft transversely thereto. The camshafts 41 are provided with drive gears 43*a,b* at their other ends, by means of which they can be rotated in a counter-rotating manner by means of a common gear rack drive element 44 having dual gearing 45.

The gear rack drive element 44 is formed by a piston rod 46 of a piston 47, which is part of a pneumatic piston-cylinder unit 48 which is also in the housing 12 at the side next to the mixer shaft.

As can be seen from FIG. 1, the cylinder chamber 49 of the piston-cylinder unit 48 is closed at the bottom with a closing lid 50, to which the piston abuts in its lowest position, shown with a broken line. The piston rod 46 is formed as a hollow cylinder, with an axial guide bore 51 for a helical spring 52, which is supported on the bore base 53 of the guide bore 51 on a spring support 54 on the one hand, and on the upper frontal side 55 of a cylinder chamber 56 on the other hand, in which the piston rod 46 is mounted axially displaceable.

The helical spring 52 serves as a reset spring for the piston 47 in the lowest position, which is shown with a broken line, when the cylinder chamber 49 is not charged with compressed air. So as to avoid that the pretensioned reset spring 52 bends to the side in the lowest position of the piston above the piston rod, there is provided a guide mandrel 57 projecting from the upper frontal side 55 downwards, around which the helical spring winds.

Turning now to FIGS. 2 and 4, it can be seen that the actuating cams 42*a,b* are arranged in a mirror-image to one another and have a cam radius r, which increases steadily from a minimum value to a maximum value by means of an angle of rotation of approximately 180°. The cams 42 act on the lower end of an actuating cam 59, which surrounds the mixer shaft 24 and which forms, together with the bearing reception 32, which is threaded in at the upper end of the actuating shaft, a lifting element 60 for displacing the mixer shaft 24. For lifting the lifters of the mixing head 16 in the mixing chamber 14, and for releasing the opening 21, the cylinder chamber 49 is charged with compressed air, whereby the piston 47 moves in the cylinder chamber with increasing pressure from the broken line in FIG. 1 to the position shown as a solid line. The piston rod 46, which is moved to the top, rotates the two camshafts 41 in a counter-rotating manner to one another by means of the gear rack 44 which mesh with the drive gears 43a,b, so that the actuating cams 42*a,b* are rotated from their position shown in FIG. 4 into the position according to FIG. 2 and thereby displace the lifting element 60 upwards, which consists of the actuating sleeve 59 and the bearing reception 32. This axial movement is transferred to the mixer shaft 24 by means of the upper grooved ball bearing 29, which shaft is lifted axially together with the mixing head 16 by the same amount as the lifting element 60, and releases the outlet opening 21 therewith.

When the largest desired opening cross section is achieved for the mixture outlet 22, which is shown in FIGS. 1 and 2, the lifting element 60 abuts a stopper element 62 by means of a part 61, which is mounted on the upper frontal side of the bearing reception 32, which is adjustably threaded by means of an inner thread which is provided in the head 13 of the housing from above. The shifting path of the mixer shaft and of the mixing head is limited by means of the stopper element 62, the length of the shifting path can be changed by threading the stopper element in the inner thread.

When the pressure in the piston-cylinder unit 48 is reduced for closing the mixture outlet 22, the helical spring 52 presses the piston 47 back into its lower position, which is shown as a broken line, whereby the actuating cams 42 which are driven by the camshafts 41 are rotated back into the position shown in FIG. 4. The mixer 17 is moved back into the closing position by means of a closing spring 64 arranged in the head of the housing, in which the tip 20 of the mixing head 16 closes the opening 21 of the mixture outlet 22. The closing spring 64, which is formed as a helical spring, is mounted on the one hand on a part 61 forming a spring plate, and on the other hand on a spring stopper 65, which is, similar to the stopper element 62, threaded into the inner thread 63 at the head 13 of the housing and can be threaded in the inner thread forward or backward for changing the pretensioning of the closing spring 64. The closing spring 64 presses the mixer shaft 24 and the mixing head 16 by means of the spring plate 61, the bearing reception 32 and the upper grooved ball bearing 29 rigidly downwards into the direction of the mixing chamber 14, in which the mixer tip abuts the edge of the opening 21 closely.

Turning to FIG. 4, it can be seen that a little gap remains between the actuating cams 42*a,b* and the actuating sleeve 59 in the lowest position of the lifting element 16, that is in the position of the mixing head 16 which closes the opening 21. This gap serves to ensure that the mixing head is pressed with its tip 20 by means of the mixer shaft and the other parts of the device by the closing spring 64 into tight contact with the edge of the opening. 21, is closed securely and completely, and that an annular gap between the tip 20 and the edge of the opening 21 does not remain, which could occur without the gap 66 which is visible in FIG. 4 between the actuating cams and the actuating sleeve. For the adjustment of the gap 66, which should be as small as possible when the device is operated, and which usually is not larger than a few micrometers, the particular design of the guide sleeve 33, which has already been mentioned above, of the bearing reception 33, which is displaceable therein, but does not rotate with regard to the guide sleeve, and of the actuating sleeve 59, which is provided with a thread 68 in its through bore 67 for the mixer shaft 24, into which is threaded the bearing reception 32 with a thread continuation 69. The actuating sleeve 59 is received axially displaceable in the housing 12, but it cannot rotate with regard to the housing, which is facilitated by a non-circular cross section of the actuating sleeve 59, which can be seen when comparing the wall thickness of the sleeve 59 in FIGS. 1 and 2. The guide sleeve 33 can be rotated in the housing by means of a tool which is connected to the tool connector 38, which is connected to the outside 37 of the housing for adjusting the gap 66, whereby the stopper pin 36 carries the bearing reception 32 along and threads the thread continuation 69 into or out of the actuating sleeve and changes the axial position of the actuating sleeve in the housing. The relative position of the lifting element 60 and the actuating cams of the cam drive 40 can be adjusted in a simple manner and exactly in such a way that the tolerance 66 between the cams and the actuating sleeve in the closed position shown in FIG. 4 is as small as possible, but in any case large enough to ensure a safe closure in the mixing head.

The invention is not limited to the embodiment which is depicted and described, but there result many changes and additions without leaving the scope of the invention. With the described embodiment, the camshafts are designed as one part with their actuating cams and the drive gears, and can be exchanged as a whole, for example, when other ratios are desired for the opening speed and acceleration of the mixing head having other cam designs for the processing of a different mixture. Alternatively, it is also possible to mount the actuating cams exchangeably at the camshafts and not to change the entire camshafts, but only the cams themselves. Instead of the depicted and described pneumatic cylinder, one can obviously choose a hydraulic cylinder or another suitable drive for the cam drive, for example an electric motor, which rotates both camshafts by means of a suitable reduction gear. Instead of the radial ball bearings which are installed in the embodiment for the mixer shaft, needle bearings or the like can be used for high rates of revolution, whereby the axial movement of the lifting element is transferred to the mixer shaft by means of a separate axial roller bearing, as needle bearings cannot transfer axial forces in contrast to grooved ball bearings.

What is claimed is:

1. A device for producing and/or processing of mixtures having several components, in particular plastic mixtures, said device comprising: a mixing head with at least one inlet for the mixture or its components; a mixer which can be driven rotatably in said mixing head for mixing the mixture or its components; an outlet for the mixture; said mixer being arranged in said mixing head and being axially displaceable relative to said mixing head by means of a drive unit, said mixer releasing or closing said outlet depending on the axial position of said mixer; said drive unit includes a mechanical cam drive with at least one actuating cam which cooperates with a lifting element which engages said mixer or its shaft.

2. The device according to claim 1, wherein said cam drive comprises at least one camshaft having said at least one actuating cam, said camshaft being pivotally mounted in a bearing housing adjacent to said mixer shaft.

3. The device according to claim 2, wherein aid cam drive comprises a first and a second camshaft arranged in parallel with each other and said at least one actuating cam being a first and a second actuating cam attached to said first and second camshafts respectively, said first and second camshafts being rotatably mounted in a common bearing housing on both sides of said mixer shaft.

4. The device according to claim 3, wherein said first and second camshafts are driven in an oppositely rotating direction.

5. The device according to claim 4, wherein said cam drive further includes a common drive element for driving said first and second camshafts.

6. The device according to claim 5, wherein said first and second camshafts are provided with a first and a second drive gear respectively, and said common drive element is a gear rack which interengages with said first and second drive gears and is displaceably driven in said axial direction.

7. The device according to claim 6, wherein said gear rack includes a first and a second linear gear and said first and second linear gears engaging said first and second drive gears respectively, said first and second camshafts rotating about parallel axes on either side of said mixer shaft.

8. The device according to claim 7, wherein said drive element includes a piston-cylinder unit.

9. The device according to claim 8, wherein said drive element includes a reset spring.

10. The device according to claim 9, wherein said drive element includes an axial guide bore for said reset spring which is formed as a compression spring.

11. The device according to claim 9, wherein said drive element further includes a guide mandrel for said reset spring which is formed as a compression spring.

12. The device according to claim 11 wherein said first and second actuating cams have a cam design with a steady or smooth course.

13. The device according to claim 12, wherein said first and second actuating cams have a cam radius which increases from the closing position to the position of said mixer in which said mixer releases the outlet of said mixing head.

14. The device according to claim 13, wherein said first and second actuating cams are arranged in a parallel manner, are formed in a mirror image to one another and are driven in a counter-rotating manner.

15. The device according to claim 14, wherein said first and second actuating cams are arranged exchangeably at the corresponding camshaft.

16. The device according to claim 15, wherein said first and second camshafts are mounted exchangeably in said housing.

17. The device according to claim 16, wherein said lifting element is adjustably connected to said mixer shaft in said axial direction.

18. The device according to claim 17, herein said lifting element consists essentially of an actuating sleeve surrounding said mixer shaft coaxially and a bearing reception for an axial bearing of said mixer shaft.

19. The device according to claim 18, wherein said axial bearing consists of a radial grooved ball bearing.

20. The device according to claim 18, wherein said lifting element is axially displaceable by said first and second actuating cams against the action of a closing spring in said housing.

21. The device according to claim 20, said bearing reception surrounds said mixer shaft in a manner of a sleeve and is provided with an outer thread with which said mixer shaft is threaded onto an inner thread which is provided at said actuating sleeve.

22. The device according to claim 21, wherein said bearing reception is adjustable relative to said actuating sleeve from outside of said housing.

23. The device according to claim 22, wherein said bearing reception is located axially displaceably in a guide sleeve.

24. The device according to claim 23, wherein said bearing reception is stopped with regard to said guide sleeve in the peripheral direction.

25. The device according to claim 24, wherein said guide sleeve is rotatable relative to said housing.

26. The device according to claim 25, wherein said guide sleeve includes at least one radially inwardly projecting holding pin which encloses a groove which extends along said bearing reception in said axial direction.

27. The device according to claim 26, wherein said guide sleeve is provided with a tool connection which can be accessed from outside of said housing.

28. The device according to claim 27, further including at least one stopper element for one of said mixer and said mixer shaft.

29. The device according to claim 28, wherein said housing comprises a housing head in which said at least one stopper element is arranged.

30. The device according to claim 29, wherein said housing head forms a cylindrical reception for the upper or the rear end of said mixer shaft and has an inner thread into which said at least one stopper element is adjustably threaded.

31. The device according to claim 30, wherein said mixer shaft abuts said at least one stopper element indirectly by way of said bearing reception.

32. The device according to claim 31, wherein said closing spring is arranged in said head of said housing and has oppositely facing first and second ends, said closing spring acting on one of said mixer shaft and said bearing reception with said first end in said axial direction, and said closing spring being supported at said second end by a spring stopper.

33. The device according to claim 2, wherein said first end of said closing spring acts on said mixer shaft by way of a spring plate which is mounted at said bearing reception.

34. The device according to claim 33, wherein said spring stopper is arranged adjustably in said head of said housing.

35. The device according to claim 28, wherein said mixer shaft abuts said at least one stopper element indirectly by way of said bearing reception.

36. The device according to claim 23, wherein said guide sleeve includes at least one radially inwardly projecting holding pin which encloses a groove which extends along said bearing reception in said axial direction.

37. The device according to claim 23, wherein said guide sleeve is provided with a tool connection which can be accessed from outside of said housing.

38. The device according to claim 18, wherein said bearing reception surrounds said mixer/shaft in the manner of a sleeve and is provided with an outer thread with which said mixer shaft is threaded onto an inner thread which is provided at said actuating sleeve.

39. The device according to claim 18, wherein said bearing reception is adjustable relative to said actuating sleeve from outside of said housing.

40. The device according to claim 18, wherein said bearing reception is located axially displaceable in a guide sleeve.

41. The device according to claim 18, wherein said bearing reception is stopped with regard to said guide sleeve in the peripheral direction.

42. The device according to claim 41, wherein said guide sleeve is rotatable relative to said housing.

43. The device according to claim 18, wherein said closing spring is arranged in said head of said housing and has oppositely facing first and second ends, said closing spring acting on one of said mixer shaft and said bearing reception with said first end in said axial direction, and said closing spring being supported at said second end by a spring stopper.

44. The device according to claim 18, wherein said first end of said closing spring acts on said mixer shaft by way of a spring plate which is mounted at said bearing reception.

45. The device according to claim 5, wherein said drive element includes a piston-cylinder unit.

46. The device according to claim 5, wherein said drive element includes a reset spring.

47. The device according to claim 46, wherein said drive element includes an axial guide bore for said reset spring which is formed as a compression spring.

48. The device according to claim 47, wherein said drive element further includes a guide mandrel for said reset spring.

49. The device according to claim 3, wherein said first and second actuating cams are arranged in a parallel manner, are formed in a mirror image to one another and are driven in a counter-rotating manner.

50. The device according to claim 2, wherein each of said at least one camshaft is provided with a drive gear which can be rotated by means of a gear rack drive element which is displaceably driven in the axial direction.

51. The device according to claim 2, wherein said at least one actuating cam is arranged exchangedly at the corresponding said at least one camshaft.

52. The device according to claim 2, wherein said at least one camshaft is mounted exchangedly in said housing.

53. The device according to claim 1, wherein said at least one actuating cam has a cam design with a steady or smooth course.

54. The device according to claim 1, wherein said at least one actuating cam includes a cam radius which increases from the closing position to the position of said mixer in which said mixer releases the outlet of said mixing head.

55. The device according to claim 1, wherein said lifting element is adjustably connected to said mixer shaft in said axial direction.

56. The device according to claim 55, wherein said lifting element consists essentially of an actuating sleeve surrounding said mixer shaft coaxially and a bearing reception for an axial bearing of said mixer shaft.

57. The device according to claim 56, wherein said axial bearing consists of a radial grooved ball bearing.

58. The device according to claim 1, wherein said lifting element is axially displaceable by said at least one actuating cam against the action of a closing spring in said housing.

59. The device according to claim 1, further including at least one stopper element for one of said mixer and said mixer shaft.

60. The device according to claim 59, wherein said housing comprises a housing head in which said at least one stopper element is arranged.

61. The device according to claim 59, wherein said housing head forms a cylindrical reception for the upper or the rear end of said mixer shaft and has an inner thread into which said at least one stopper element is adjustably threaded.

62. A method for opening and closing of a closing element in a device for producing and/or processing of mixtures of several components in which said closing element is first raised slowly from the outlet opening during the opening movement for releasing an outlet, and is, with an increasing distance from the outlet opening, moved away therefrom increasingly faster, and in which, during the closing for shutting off the outlet, the closing element, which has a distance from the outlet opening, will initially be moved with a higher speed towards the opening, and with decreasing distance from the opening, when it is getting nearer thereto, the closing speed will be reduced.

63. A method for opening and closing of a closing element in a device for producing and/or processing of mixtures of several components, said device comprising a mixing head with at least one inlet for the mixture or its components, a mixer which can be driven rotatably in said mixing head for mixing the mixture or its components, an outlet for the mixture, said mixture being arranged in said mixing head and being axially displaceable relative to said mixing head by means of a drive unit, in which said mixer constitutes a closing element which during the opening movement for releasing an outlet in said mixing head is first raised slowly from the outlet opening and is, with an increasing distance from the outlet opening, moved away therefrom increasingly faster, and in which, during the closing for shutting off the outlet, said mixer constituting the closing element, which has a distance from the outlet opening, will initially be moved with a higher speed towards the opening and with decreasing distance from the opening which it is getting nearer thereto, the closing speed will be reduced.

* * * * *